US006857394B2

United States Patent
Redford

(12) United States Patent
(10) Patent No.: US 6,857,394 B2
(45) Date of Patent: Feb. 22, 2005

(54) WINDOW SEAT PERCH AND PROTECTOR FOR DOMESTIC BIRDS

(76) Inventor: John Redford, 5829 N. Spaulding Ave., Chicago, IL (US) 60659

( * ) Notice: Subject to any disclaimer, the term of this patent is extended or adjusted under 35 U.S.C. 154(b) by 0 days.

(21) Appl. No.: 10/389,144

(22) Filed: Mar. 14, 2003

(65) Prior Publication Data
US 2003/0221632 A1 Dec. 4, 2003

Related U.S. Application Data
(60) Provisional application No. 60/383,857, filed on May 29, 2002.

(51) Int. Cl.[7] .............................................. A01K 31/12
(52) U.S. Cl. ...................................................... 119/537
(58) Field of Search ................................... 119/537, 533

(56) References Cited

U.S. PATENT DOCUMENTS

| | | | | |
|---|---|---|---|---|
| 4,261,294 A | * | 4/1981 | Bescherer ................... 119/57.8 |
| 4,361,116 A | * | 11/1982 | Kilham ..................... 119/51.01 |
| 4,753,195 A | * | 6/1988 | Maggio ...................... 119/52.2 |
| 4,892,060 A | * | 1/1990 | Lundquist ................... 119/52.2 |
| 4,953,503 A | * | 9/1990 | Lundquist ................ 119/51.01 |
| 5,904,330 A | * | 5/1999 | Manico et al. ........... 248/206.3 |
| 6,532,899 B1 | * | 3/2003 | Hootman ..................... 119/253 |

* cited by examiner

Primary Examiner—Teri P. Luu
Assistant Examiner—Susan C. Alimenti
(74) Attorney, Agent, or Firm—Chapman & Cutler LLP

(57) ABSTRACT

An article for a domestic bird is provided with a perch rod surrounded by protective base, window wall, and side walls for mounting inwardly of a window of a building. A domestic bird free-flying in the building, or a clipped bird climbing a ladder or braided rope, can alight on the perch rod in the article and enjoy the light of the window while being prevented from pecking and damaging the wood and other structure of the window. The window wall and side walls of the article extend well above or beyond the perch rod a distance greater than the maximum reach of the bird's beak while the bird is standing on the perch rod. A portion of the article also comprises a base below the perch rod, for catching droppings and spatters of the bird. The article is mounted to the window glass by suction cups, and can be further supported by cushions on the base of the article which engage a horizontal surface of the window structure, as a sill of the window structure or the top of a lower sash. The article is preferably molded in one piece, with the base and window sides rounding smoothly into one another and into side walls.

6 Claims, 1 Drawing Sheet

WINDOW SEAT PERCH AND PROTECTOR FOR DOMESTIC BIRDS

PRIORITY CLAIM

Applicant claims the benefit of priority of his Provisional Application for U.S. patent, filed May 29, 2002 as Ser. No. 60/383,857.

FIELD OF THE INVENTION

The present invention relates to perches for domestic, indoor birds, particularly to perches for free-flying birds, and for clipped birds that can climb onto perches, and to such perches provided adjacent windows to the outside.

BACKGROUND OF THE INVENTION

Many owners of domestic birds like to let their birds periodically fly free in their homes and offices where the birds normally reside in cages. Free flying encourages health in the birds, keeps their spirits up, and is enjoyed by the owners and their guests. Birds tend to fly to windows where sunlight is admitted to the home or office, and they like to perch there at least on window sills, mid-level curtain rods, plants, and other places where they can warm themselves and look out at the world through the window glass. Birds with clipped wings can climb on ladders, braided rope or leather, and the like from floor or cage level to window levels for sitting on perches. However, birds also tend to peck and to make droppings where they perch, leaving messes below them and causing damage to the wood and putty of the window area. Cold drafts coming off the window glass in cold weather can lead to illnesses in tropical birds. Several attempts are known for solving parts of these problems.

An accessory to an Oakridge Parrot Palace-brand line of bird travel cases provides a "travel/window perch". The device is triangular in section and has four clear plastic sides, holes in the bottom for attaching atop a travel case, and "may also be attached to windows with suction cups". The window-side wall of the perch does not rise significantly above the level of the perch rod, however, so a bird sitting on the rod can easily peck at the window sash. The side walls of the Oakridge perch also are low, allowing pecking at sides of the window sash or a side of the window opening.

U.S. Pat. No. 2,720,188 shows a portable bird perch with a suction cup holding a perch rod perpendicular to a window or other surface and suspending a droppings pan beneath it. No means for attaching the perch or pan to, or supporting either on, a window sill are shown or suggested. No shields or barriers are shown, so the window sash remains exposed for pecking.

U.S. Pat. No. 4,660,507 shows an exterior window perch for wild birds to alight upon adjacent a window for people to watch the birds from inside the house. A droppings pan is suspended beneath a perch rod on wires. No barriers to pecking are provided, but the rod is said to be sufficiently far from the window glass as to avoid pecking by a bird that is sitting on the perch rod.

US Design Patent D-363368 shows an ornamental form of sectional bird perch with outer and bottom walls of clear material. The outer wall again is short and would not protect the sash from pecking.

A need has long existed for a perch for an indoor domestic bird adapted for use adjacent a window in a home or office, having features to protect the window glass and sash from pecking damage by a bird using the perch. A need has also long existed for means for protecting a bird on such a perch from cold drafts coming off the window glass during cold weather times.

SUMMARY OF THE INVENTION

A four-sided clear acrylic article open to one side and the top is provided for a domestic bird, as a parrot or parakeet, to fly or to climb into and then to sit adjacent a window to the outside world in a home or office. A bottom panel of the article rests upon the window sill or the top of a lower sash or other mounting adjacent the window and carries a perch for the bird to sit upon. The left and right sides and the back, by the window, of the article comprise acrylic panels to protect the bird from drafts while it is sitting there enjoying the light and the view. The plastic importantly also entirely protects the window components from pecking by the bird. An array of suction cups connect the far side of the article to the window glass for support and stability.

DISCLOSURE OF THE PREFERRED EMBODIMENTS

Figure 1:
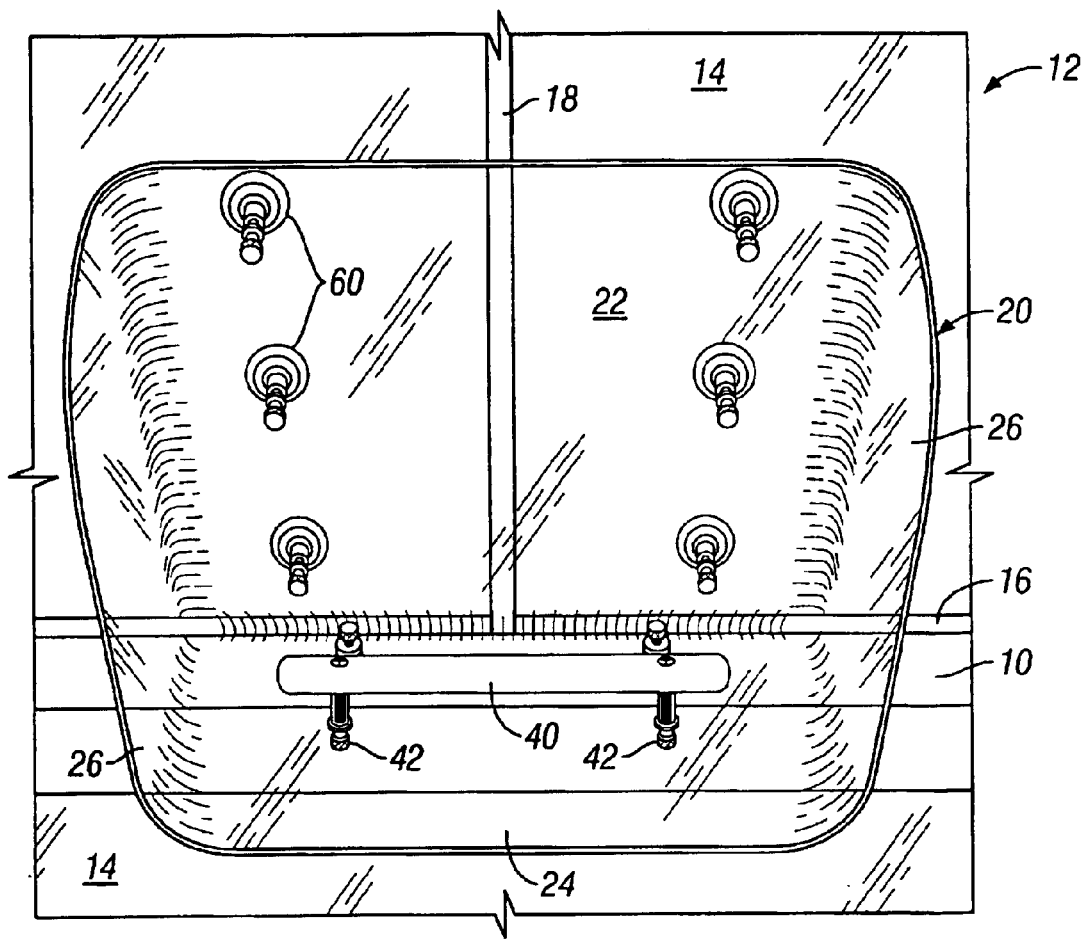
FIG. 1 shows an isometric view of one preferred form of the perch and protective sides of the invention.

A sill 10 of a window 12 is arranged in the wall of a house or other building. The sill 10 can be the fixed lower sill of a window, adjacent the bottom of the lower, or it can be the upper sill of the moveable lower sash where mating with the lower sill of the upper sash occurs in a double-hung window, depending on the size and construction of the window. The window comprises one or more panes of clear glass 14 in each sash (shown as two above and one below) and a sash or surround of wood 16, and it may be provided with mullions 18 dividing the glass 14, here shown as just of the upper sash, into separate panes. The wood may be oak, pine, or another species, all of which are softer than a bird's beak. The wood is typically painted or stained and coated to give it a protective finish.

A window seat 20 according to the invention is carried on the sill 10 or another part of the window, as the top of the lower sash, and mounted to the glass pane or panes 14. The window seat is made of clear acrylic plastic, preferably molded or formed in one piece, with rounded corners for easy manufacture and cleaning. It is formed with a large window side 22 adjacent the glass 14, a bottom panel 24 for resting on the sill 10 or other support if desired, and left and right sides 26, 26, as shown. The article in one form is provided in several sizes, each from about 12 to 22 inches wide at the top, 10 to 16 inches high, and six to ten inches deep, perpendicular to the face of the window glass 14.

A perch rod 40 is provided, attached firmly on stands 42, 42 to the bottom panel 24 of the window seat 20 in one embodiment. The stands 42 need not be long, as just 1.5 to 3 inches, made for instance of acrylic tubing, ⅜-inch dowels or metal tubes. Longer stands, or the alternate form below, can be used for long-tailed birds. The perch rod 40 is for instance a one inch or a ⅝-inch hardwood dowel, as oak or manzanita wood. The stands 42 are attached firmly, so as not to wobble under the weight and activity of the bird, by screws inserted through the dowel and stabilized by washers bearing on the bottom panel 24.

Figure 2:
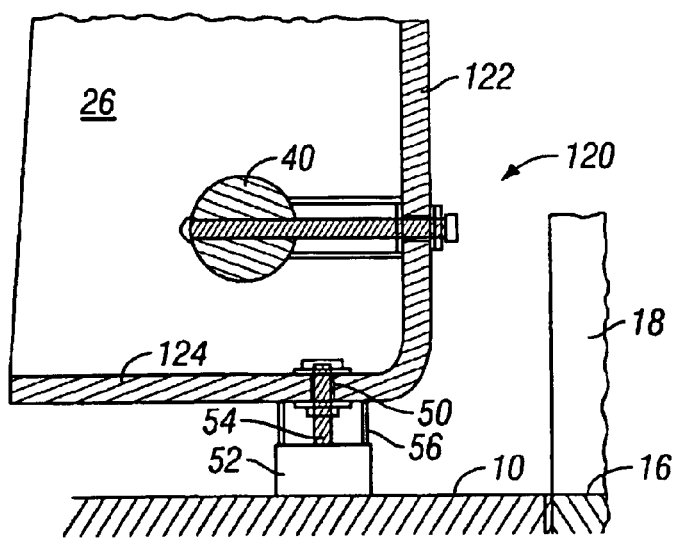
FIG. 2 is a sectional view through the base and window wall, showing the base cushion and an alternate manner of fixing the perch rod to the article.

In another form, the perch rod 40 can be attached in a window seat 120 at any selected height to the window wall 122 of the article, as in FIG. 2. For heavier birds, added bracing to the plastic, as larger washers or even an L- or tee-shaped bracket (not shown), may be needed as part of the structure. This form enables easier cleaning of the bottom panel 124 of the article 120, as well as more flexibility in the height of the perch rod 40 above that panel 124.

The bottom panel 24 or 124 of the article 20 or 120 is formed with holes 50, 50 for attaching rubber cushions 52, 52 to engage the sill 10 or other horizontal surface of the window. The cushions 52 are held by screws and stand-offs 54, 56, as shown in FIG. 2.

A plurality of suction cups 60 are removably fastened to the back wall 22 or 122 of the article, adjacent the glass 14, as shown in FIG. 1. Any standoff hardware needed may be used to allow the suction cups 60 to reach and removably attach to the glass 14 while the wall 22 or 122 clears mullions 18 or hardware on the window 12 and also to allow the window seat 20 or 120 to stand upright on the sill 10 or other mounting. The suction cups can be easily released from the window glass when the article 20 or 120 is to be removed for cleaning or moving to another location.

In use, the window seat 20 or 120 is suitably mounted to a window sill or sash 10 or other support and to the window glass 14, adjusting the cushions 52 and the suction cups 60 as needed to mount the article horizontally and vertically. Then a domestic bird flying free in the home or office will fly into the article and land upon the perch rod 40. A bird with its wing feathers clipped can climb a ladder or rope (not shown) to the window seat and onto the perch rod 40. Once on the perch, the bird is unable to reach or lean beyond the walls 22 or 122, 24 or 124, and 26, 26 to peck at the window glass or at the wood sash or mullions. Droppings and splatters are caught on the bottom panel 24 or 124 of the window seat 20 or 120, which can be protected with paper or cleaned in place, or the entire article 20 or 120 can be disconnected from the window and taken to a sink or dishwasher for care.

Although several forms of the invention have been described, other embodiments may occur to others that still come within the scope of the present invention. All such embodiments the accompanying claims take advantage of the present invention benefits.

I claim as my invention:

1. A window perch article for a domestic bird, the perch comprising a plastic article open to at least one side for the bird to fly or climb into and then to sit adjacent a window in a wall of a building on a perch rod mounted with the article, the article comprising:
    a bottom panel adapted to be supported on a horizontal surface of a window structure adjacent to a glass pane thereof;
    left and right side walls and a window wall adjacent the window, each mounted to the bottom panel and at least the window wall comprising clear plastic;
    at least two suction cups removably connecting the article to the window glass; and
    a perch rod affixed to at least one of the panel and the walls for the bird to sit upon, and wherein
    the side walls and the window wall extend beyond the reach of a beak of the selected bird sitting on the perch, whereby to protect the interior of the window from pecking and other damage by the bird, and wherein
    the bottom panel, window wall, and left and right side walls of the article are molded in one piece of clear plastic.

2. A window perch article for a domestic bird, the perch comprising a plastic article open to at least one side for the bird to fly or climb into and then to sit adjacent a window in a wall of a building on a perch rod mounted with the article, the article comprising:
    a bottom panel adapted to be supported on a horizontal surface of a window structure adjacent to a glass pane thereof;
    left and right side walls and a window wall adjacent the window, each mounted to the bottom panel and at least the window wall and comprising clear plastic and further comprising smoothly rounded corners among the bottom panel, window wall, and side walls of the article;
    at least two suction cups removably connecting the article to the window glass; and
    a perch rod affixed to at least one of the panel and the walls for the bird to sit upon, and wherein
    the side walls and the window wall extend beyond the reach of a beak of the selected bird sitting on the perch, whereby to protect the interior of the window from pecking and other damage by the bird.

3. A window perch for a domestic bird, the bird having a beak and a maximum reach from its feet to its beak, the perch adapted to be removably mounted onto an interior side of a window of a building to enable the bird to look out through the window but preventing the bird from reaching and damaging the window structure by pecking or by its droppings, the window perch comprising:
    a single molded sheet of acrylic plastic with rounded corners forming a base, a window wall generally perpendicular to the base, and left and right side walls generally perpendicular to each of the base and the window wall; and
    a perch rod mounted to the molded plastic sheet and extending inwardly of the base and walls; and wherein
    the walls and base of the window perch extend farther than the maximum reach of the beak of the bird when sitting on the perch, so that the window wall and side walls prevent damage to the window from pecking by the bird and the base prevents soiling outside the perch.

4. A window perch as defined in claim 3, wherein the window perch is mounted to the window principally by means of a plurality of suction cups carried on the window wall of the perch and removably adhering to glass of the window of the building.

5. A window perch as defied in claim 3, wherein the window perch is mounted to the window in part by at least one soft cushion carried on an underside of the base, each said cushion adapted to a horizontal surface of the window and to support some of the weight of the perch and the bird.

6. A perch article for a domestic bird, the perch article adapted for mounting adjacent a glass window supported in a sash and frame structure in a domestic or office setting, the article comprising:
    a barrier of sheet material carried on or adjacent the perch rod in a position toward the glass of the window from the perch rod, the barrier extending generally parallel to the window glass above and to the sides of the perch rod and also below the perch rod, adjacent the glass, sash, and structure of the window, to points thereon that are beyond the reach of a beak of the bird on the perch rod, thereby to prevent the bird on the perch from damaging the window by its pecking, and
    a perch rod carried in fixed relation to the glass, sash, and frame of the window, and positioned a first distance from said glass, sash and frame of the window, and wherein
    a base extends a second distance from the glass, sash, and frame of the window, wherein the second distance is greater than the first distance, to prevent the bird on the perch from soiling the domicile or office outside the perch by its droppings.

* * * * *